United States Patent [19]

Tennies et al.

[11] Patent Number: 5,606,236
[45] Date of Patent: Feb. 25, 1997

[54] TWO WIRE POSITION SENSE AND CONTROL OF MODULATING GAS VALVE OR OTHER ELECTROMECHANICAL ACTUATORS

[75] Inventors: Charles J. Tennies, Waukesha; Todd L. King, Cedarburg, both of Wis.

[73] Assignee: Eaton Corporation, Cleveland, Ohio

[21] Appl. No.: 373,168

[22] Filed: Jan. 17, 1995

[51] Int. Cl.[6] .................................................. G05B 11/06
[52] U.S. Cl. ............................ 318/626; 318/652; 318/671
[58] Field of Search ..................................... 318/560, 626, 318/638, 644, 647, 652, 653, 663, 671

[56] References Cited

U.S. PATENT DOCUMENTS

| | | | |
|---|---|---|---|
| 4,251,762 | 2/1981 | Williams | 318/653 |
| 4,658,858 | 4/1987 | Beale . | |
| 5,207,239 | 5/1993 | Schwitalla | 137/115 |

Primary Examiner—Bentsu Ro

[57] ABSTRACT

A method and system for controlling an electromechanical actuator assembly and measurement of actuator position via two drive wires to the actuator assembly. The system includes sensing the changing inductance of the actuator through the electrical drive line and associating the sensed inductance with a corresponding position of the actuating member.

8 Claims, 10 Drawing Sheets

TWO WIRE POSITION SENSE AND CONTROL OF MODULATING GAS VALVE OR OTHER ELECTROMECHANICAL ACTUATORS

BACKGROUND OF THE INVENTION

The present invention relates to the control of an electromechanical actuator assembly including an actuating member moved by energization of an associated electrical coil, and particularly to techniques for identifying a position of the actuating member relative to the coil by measuring a parameter representative of inductance attributable to a position of the actuating member. The invention has intended use relating to the control of a fuel, such as a gas flow to a burner, when the fuel is communicated to the burner through an electromagnetically operated valve. The invention is most applicable to techniques for remotely controlling an electrically operated proportional valve to provide closed loop valve position control, but is also applicable to any type of electromechanical actuator having a varying parameter resulting from actuator movement.

A wide variety of sensing devices for detecting position of an actuating member in an electromechanical actuator assembly are known in the art. Most of these devices employ supplemental devices on the electromechanical actuator assembly to monitor relative positions of the working elements of the assembly. For example, numerous types of proximity sensors, limit switches and the like to detect actuator movement have been employed. In particular, common present day actuator position sensing devices will employ a magnetic sensor such as a Hall or magnetoresistive sensor located inside the valve to measure position. Another common system presently used is to attach a potentiometer to the moving member at an external location. Such various forms and types of sensing systems have enjoyed varying degrees of success, but they all have been found to have limits on their economic and practical value. In particular, all involve supplemental internal or externally mounted position transducers, which can significantly increase the complexity of the system and its costs. Particularly, when considered in the context of a gas burner, it is desirable that the control system have the ability to control the level of heat accurately and cost-effectively.

The gas range of the future will have more electronics than ever. One area where electronics is likely to come into play is in control of the valve itself. Such control will allow for features such as temperature versus time profiles, time programmed cooking, and locating the operation knob away from a hot burner location. Closed loop position control of an electromagnetic valve will allow the set position to be accurately maintained even in the presence of varying supply pressures. It will also provide greater safety as the actual valve position is always monitored.

Another safety concern for modulating gas valve assemblies is hang-up of the valve member. Most valve members are spring-biased to force the member closed so that when power to the actuating coil is cutoff, the valve member will close and shutoff gas flow to the burner. In those circumstances where a spring does not or cannot force the valve member closed, the gas flow is left running to the burner. A piece of dirt on the valve seat is an example of what could cause hang-up.

The present invention contemplates a new and improved electromechanical actuator control scheme comprising a position sensing circuit which overcomes the above-referred to problems and others to provide a new control system and method which is simple in design, economical to manufacture and readily adaptable to a plurality of electromechanical actuators, including flow control valves.

BRIEF SUMMARY OF THE INVENTION

In accordance with the present invention, there is provided a system and method of electronically controlling an electromechanical actuator assembly, including an actuating member associated with an electrical coil. Selective energization of the coil effects a corresponding movement of the member. The method comprises steps of energizing the coil through an electrical line to effect a desired corresponding movement of the actuating member, which movement will effect a corresponding change in the inductance of the actuating assembly. The inductance is sensed through the electrical line and the sensed inductance is associated with a position of the actuating member. The position of the actuating member can then be determined and controlled by selectively controlling the energizing of the coil.

The control circuit for operating the valve and detecting changes in inductance of the valve comprises a power supply and drive circuit for supplying the energy signal to effect valve movement, an oscillator for superimposing an inductance sensing signal on the energy signal and a position measurer for producing from the sensing signal a DC signal representative of the inductance and therefore the actual position of the valve member.

In accordance with a more limited aspect of the present invention, the control circuit includes a summer for generating an error signal proportional to a difference between a command position for the valve member and the actual position and further comprises an output circuit for controlling the energy signal to the valve based upon the error signal and thereby controls the movement of the valve member.

One benefit obtained by use of the present invention is an electromechanical control system which provides improved precision in measuring an actuating member position in a valve system without supplemental internal or externally mounted position transducers. Valve member position is detected via preexisting drive wires for the actuator.

Another benefit obtained from the present invention is a control system for modulating a gas valve which is capable of sensing precise valve member positioning and then modifying the drive current to maintain the desired valve position even during varying gas supply pressures to the valve.

A further benefit of the present invention is a modulating gas valve system which can sense actuating member hang-up and supply a closing voltage to urge closure of the valve member.

Other benefits and advantages for the subject new electromechanical actuator assembly will become apparent to those skilled in the art upon a reading understanding of this specification.

BRIEF DESCRIPTION OF THE DRAWINGS

The invention may take physical form in certain parts and arrangements of parts, the preferred and alternative embodiments of which will be described in detail in the specification and illustrated in the accompanying drawing which for a part hereof and wherein.

DETAILED DESCRIPTION OF THE PREFERRED EMBODIMENTS

Figure 1:
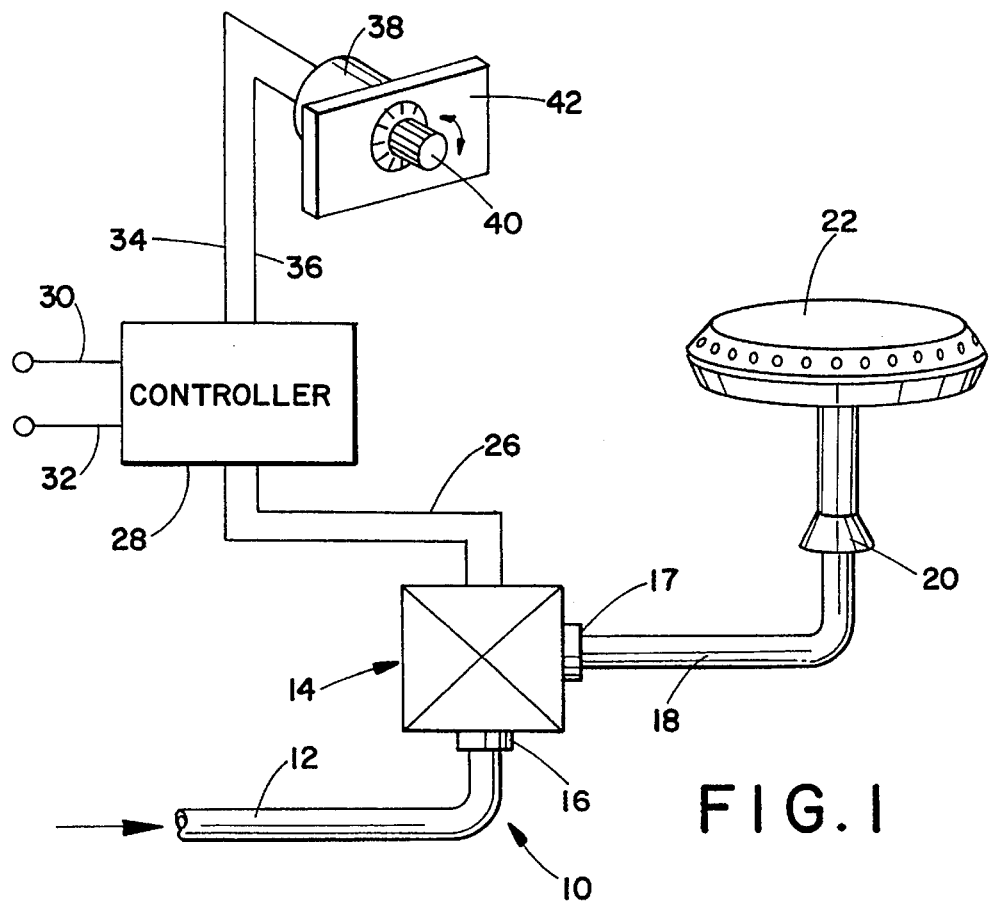
FIG. 1 is a schematic of a burner control system as applied to a top burner for a household cooking appliance including a modulating gas valve formed in accordance with the present invention.

Referring to the FIGURES wherein the showings are for purposes of illustrating the preferred embodiments of the invention only, and not for purposes of limiting the same, FIG. 1 shows a burner control system generally indicated at 10, including a fuel line or conduit 12 adapted for attachment to a source of gaseous fuel and which is connected to the inlet 16 of an electrically operated modulated valve generally at 14. Valve 14 has an outlet 17 connected to a burner tube or conduit 18 which supplies fuel gas to the aspirator inlet 20 of a burner 22.

The electrically operated valve 14 is connected to the electrical leads 24, 26 of an electronic controller 28 that receives power from power line leads 30, 32. The controller receives a control input through the leads 34, 36 connected to a user input control 38 which may comprise a potentiometer or a variable resistance device which is operated by the user's rotation of knob 40 provided on a control console or panel 42, which may be remotely located from the burner 22.

Figure 2:
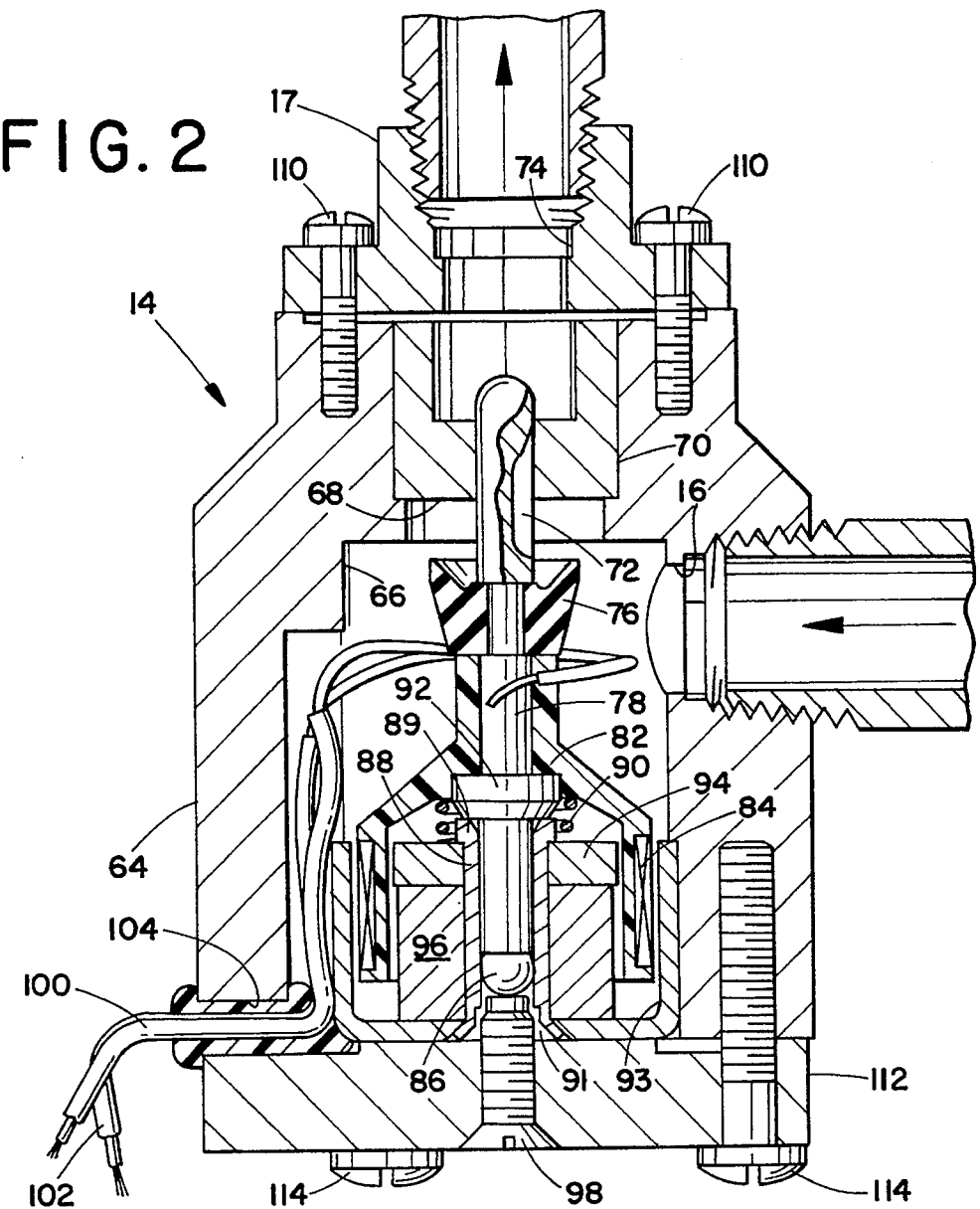
FIG. 2 is a cross-sectional view of the valve of the system of FIG. 1.

Referring to FIG. 2, a preferred form of the valve 14 in the present invention is shown as having a valve body or housing 64 which has a valving cavity 66 therein which communicates with a valve seating surface 68 which may be formed on a separate insert member 70 and which seating surface surrounds an outlet metering passage 72 which communicates with passage 74 provided in outlet 17. A resilient, preferably elastomeric, poppet 76 is disposed closed against the seating surface 68. Poppet 76 is attached to a valve member 78 which has a metering portion or rod 80 formed thereon which extends into and closely interfits in sliding engagement the metering passage 72. The valve inlet passage 16 communicates with the valving chamber 66 such that upon downward movement of the poppet 76 and valve member 78 gas flows through the annular space between metering rod 80 and passage 72 and outwardly through outlet passage 74.

Moveable valve member 78 has a bobbin member 82 attached thereto upon which is wound coil 84 which moves with the valve member 78. The remote end 86 of valve member 78 is piloted in a bushing 88 having a flanged end 89 against which one end of a spring 90 is registered with the opposite end of spring 90 registering against a flange 92 provided on the valve member. The flanged end 89 of bushing 88 has the underside thereof registered on a ferromagnetic pole piece configured as annular disc 94 which is registered against the end of annular permanent magnet 96 which is disposed concentrically and preferably within coil 84. Bushing 88 extends through annular magnet 96 through an aperture 91 formed in a ferromagnetic cup-shaped pole member 93. The lower end of bushing 88 is flared outwardly to retain the magnet and disc 94 on the cup-shaped member as a subassembly.

In the presently preferred practice of the invention, the electromagnetic actuator has the coil mounted on the moving armature. The stationary portion of the magnetic circuit comprises the permanent magnet 96, the cup-shaped steel pole piece member 93 and steel annular disc 94. The circuit is completed radially across the moving coil 84 from disc 94 to the cup-shaped pole piece 93. The annular disc 94 serves to concentrate flux from magnet 96 radially across the coil 84 to produce an axially directed force on the armature when current flows in coil 84. This axial force overcomes the force of spring 90 to move the armature and valve member in a downward direction in FIG. 2. It will be understood that the axial force on the armature is proportional to the number of ampere-turns of current in the coil. Thus, if the return of spring 90 has a linear force versus deflection relationship, the downward movement or displacement of the armature will be proportional to the ampere-turns of current in the coil. The arrangement of the magnetic circuit of the invention, wherein magnetic flux is concentrated at the outer cylindrical surface of disc 94 functions to maintain the magnitude of the axial force, per ampere-turn substantially constant for a given current flow as the armature is moved with respect to the disc 94.

The outlet fitting 17 is retained over the insert 70 by suitable fasteners such as screws 110. Similarly, the lower end of the body of the valve and chamber 66 is closed by the cap member 112 which is retained by fasteners such as screws 114. A cover screw 98 is provided through cap 112 to provide a cover over an adjustment screw which serves as an adjustable limit stop for downward movement of the valve member with respect to FIG. 2. Leads 100, 102 are attached to the coil 84 and pass through an opening 104 provided in the valve body 64.

Figure 2A:
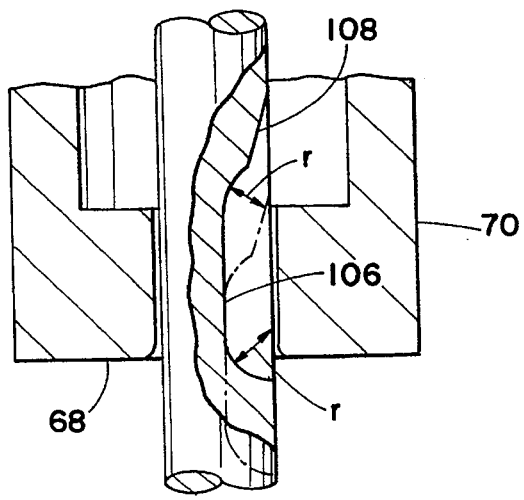
FIG. 2A comprises an enlarged view of a portion of the valve of FIG. 2.

FIG. 2A shows a detail of the metering rod 80 to particularly illustrate a groove or recess 106 therein which, preferably, has a constant width. The lower edge end of the groove is preferably formed at a radius "r", as is the upper edge end which intersects a ramped, tapered end portion noted by reference numeral 108. The configuration of the groove shown in FIG. 2A provides, upon opening the poppet end and downward movement of rod 80 to the fully open position, as shown in dashed outline, an initially maximum flow as gas flows through the deeper portion 106 of the groove. As the rod 80 continues to move downward causing tapered portion 108 to move into the metering passage 72, the flow through groove 106 is reduced; and, flow is through the portion of the groove noted by reference numeral 108. As the end groove portion of rod 80 enters passage 72, flow is diminished to a minimal amount determined by the annular clearance between rod 80 and passage 72, which is sufficient to maintain the burner flame at a low level.

In the presently preferred practice of the invention, the coil is designed to operate in very low current in the range of 20 to 140 milliamps and 24 volts dc and has 800 to 1,200, preferable 1,000, turns of free wire 37 to 39 AJW. A metering rod having a diameter of about 3.6 millimeters has a groove width of 1.78 millimeters and provides a maximum flow of 43 cubic centimeters per second ($cm^3$/sec) in a supply pressure of 25 centimeters of water column (25 cm $H_2O$).

Figure 3:
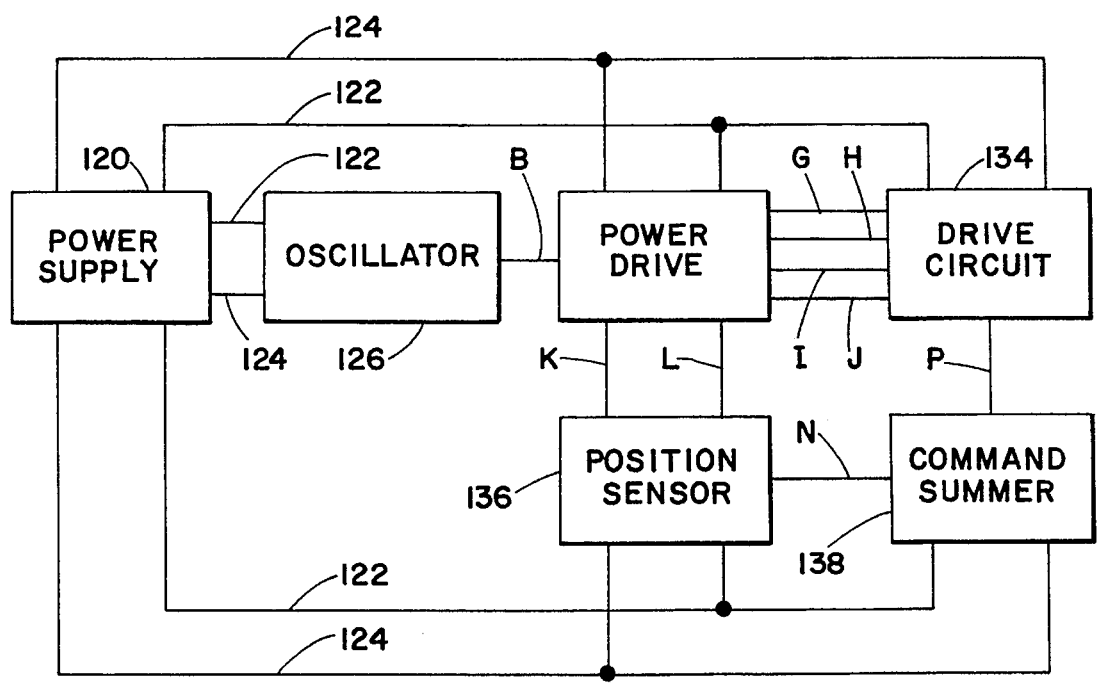
FIG. 3 is a block diagram of the control circuit formed in accordance with the present invention.

With reference to FIG. 3, a block diagram of the control circuit for controlling the electromechanic actuator assembly of the valve of FIG. 2 is shown therein. A conventional power supply 120 will convert 120 volts AC into plus and minus twelve volts DC on leads 122, 124. An excitation oscillator block 126 is also conventional in configuration and operates to generate a sine wave which goes to the power drive block 128. It is a premise of the subject invention that if the actuating coil 84 is excited with such a sine wave signal, when the coil is effectively placed in a voltage divider of the control circuit with the second inductor of the divider being a fixed value, it is possible to determine position by measuring the voltage across the fixed value inductor, as will be more fully explained hereinafter. However, for the present, the oscillator block 126 communicates a 27 kHz sine wave oscillating a plus or minus 2 volts about 6 volts to the power drive on lead B.

Figure 4:
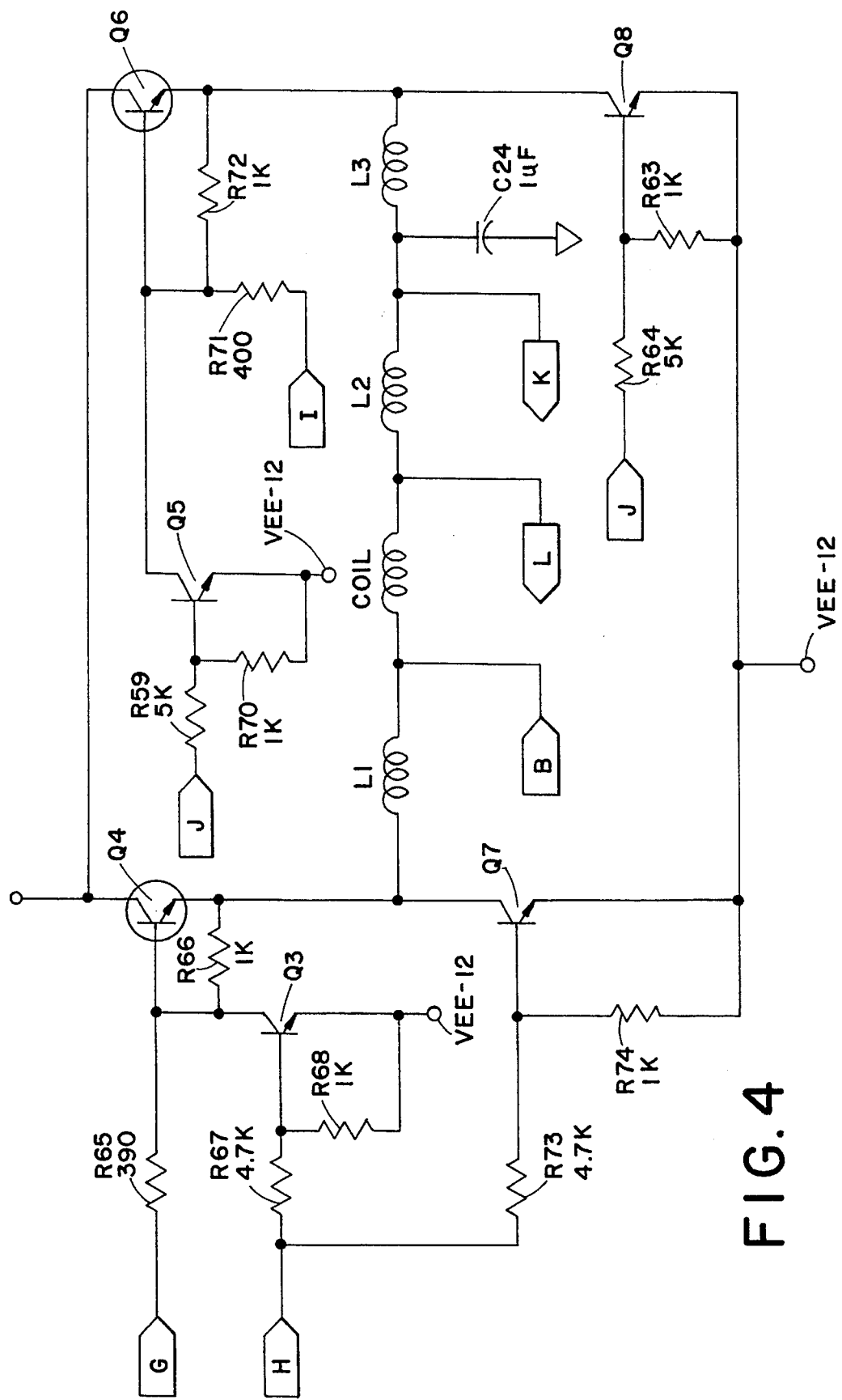
FIG. 4 comprises a detailed schematic of the power drive circuit structure of FIG. 3.

With particular reference to FIG. 3, and with additional reference to FIG. 4, the power drive block will selectively energize the coil to cause a desired movement of the valve actuating assembly. It includes a second inductor L2 comprising the second inductor of the voltage divider circuit, across which the voltage can be measured to assess an actuator inductance and a corresponding valve member position.

It should be kept in mind that the goal of the subject invention is, by merely using the two actuating wires to a solenoidal actuator, to measure its position, and by using actual versus set position error, control the actuator. In simple terms, the invention uses a DC signal to control the power electronics to drive a DC current through the coil 84 that will move the coil for controlling gas flow and, then also running a high frequency AC signal through the coil 84 to get an effective measure of coil inductance, and, therefore, the position of the actuated member as it is controlled via the DC drive current.

With particular reference to FIG. 4, the power to drive the coil 84 can flow in either of two directions, that is, the current can either come from the direction of L1 or from the direction of L2. FIG. 4 is conventionally referred to as an H bridge circuit wherein current to the coil can be driven in either direction to obtain a bidirectional movement the actuating assembly. For example, if current is to be sent to the coil in a first direction going from left to right on the page, then connection J would be powered up by the drive control circuit 134 as an enable to saturate transistor Q8 at the same time that connection J also turns on and saturates transistor Q5, which is a hold off transistor for transistor Q6 to ensure that Q6 cannot be on at the same time as Q8 is on and result in a shorted power supply. Simultaneously with Q5 and Q8 thus being at saturation, a linear signal is applied at connection G, which linear signal will not be a saturation signal but which will be a proportional signal representative of where the valve actuator is desired to be to thereby control the relative flow of gas fuel because the linear signal at G will control the flow of current through Q4 from the power supply voltage VDD+12, and thereby limit the flow of current to the coil 84. In other words, the driving current through the coil 84 will be proportional to the drive signal impressed at connection G. Conversely, Q7 and Q6 can work in the same manner as Q8 and Q4 for driving current in the opposite direction through the coil, that is, from right to left on the page. Q3 comprises a hold off transistor for Q4 to ensure that, for reliability reasons, Q4 cannot go on at the same time that Q7 is on. The linear drive signal will be applied at connection I for generating the relative proportional drive current to the coil through Q6 from VDD plus 12. Thus, bidirectional movement of the actuating assembly of the valve of FIG. 2 can be obtained by the bidirectional flow of current through the coil 84 in the circuit of FIG. 4.

Figure 6:
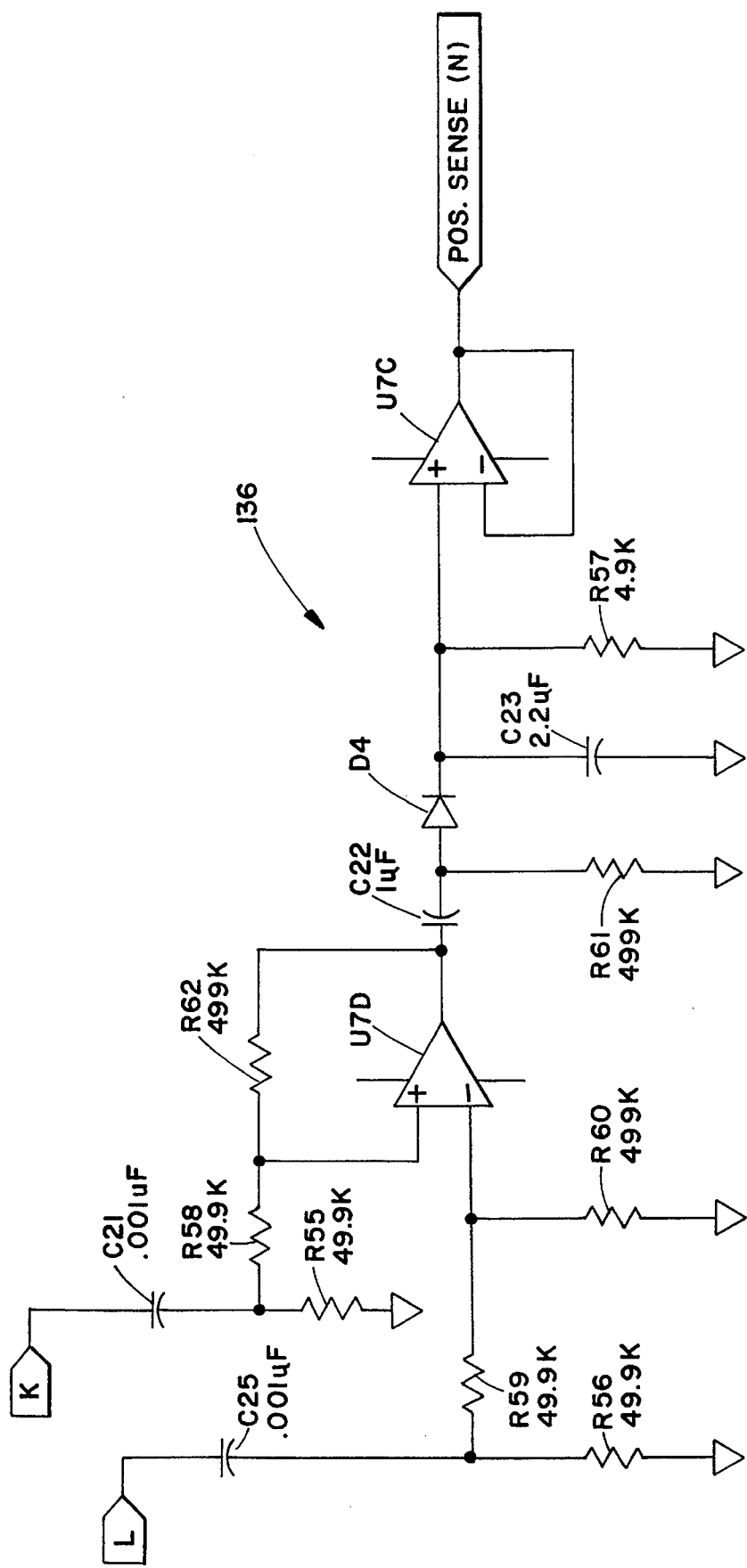
FIG. 6 comprises a detailed schematic of the position sensing circuit of FIG. 3.

As noted above, the sine wave measurement signal generated by the oscillating circuit 126 is impressed via lead B to the power drive 128. Blocking inductor L1 inhibits the signal on lead B from being communicated back to the system in a direction away from the coil 84. Both coil 84 and the second blocking inductor L2 will have a significantly lower inductance than the blocking inductor L1. Similarly, blocking inductor L3, which also has a relatively high impedance will inhibit the high frequency signal from being communicated to the rest of the system. The sine wave thus will be impressed at connection B, will travel through coil 84, inductor L2 and then back to ground through capacitor C24. The coil 84 and inductor L2 comprise a voltage divider and the voltage measured across the inductor L2 will be proportional to the AC current through the coil 84 and therefore its inductance. Connection leads K and L connect to the position sensor circuit 136 (FIG. 6), which essentially comprises a differential amplifier U7D coming out with a sine wave at pin 14 which is symmetrical about ground, rectifying it through a diode D4 and buffering it through amplifier U7C to obtain at connection lead N, a DC signal proportional to the relative position of the coil 84 and metering rod 80 in the valve assembly. This DC signal is communicated to the command summer 138 (FIG. 7) to be compared to the command signal generated by the operator of the valve. Although the circuitry of FIGS. 4, 6 and 7 comprise the preferred means for sensing and associating the sensed parameter representative of valve position, there are of course alternative circuits which can accomplish the same result in similar ways.

Figure 7:
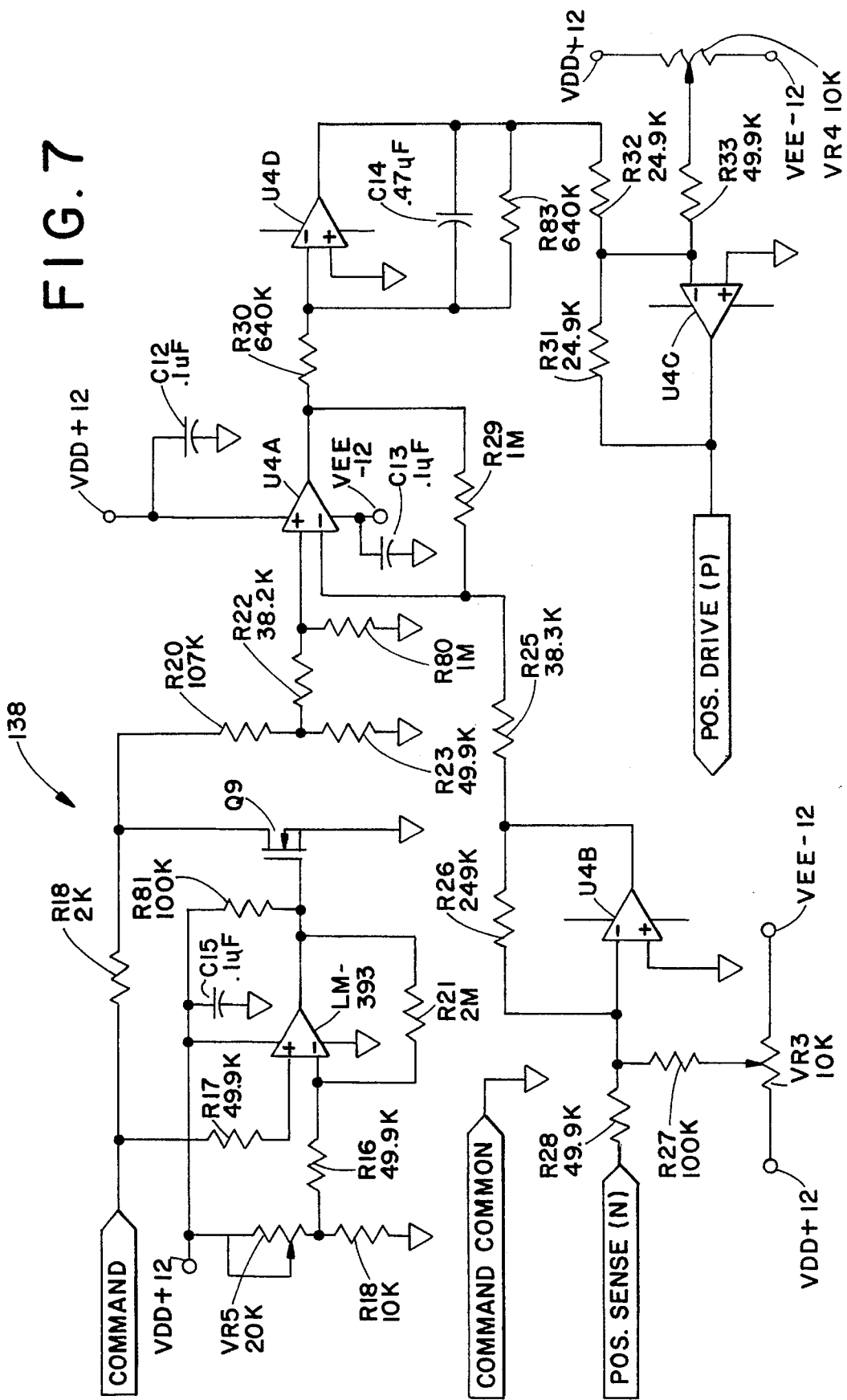
FIG. 7 is a detailed schematic of the command summer of FIG. 3.

More particularly, and with reference to FIG. 7, a command signal, such as may be generated by the control knob 40 on the gas stove, is compared at differential amplifier U4A with the position signal on lead connection N from the position sensor 136. The position sense signal is both amplified and offset through amplifier U4B and variable resistor VR3. These two signals are essentially subtracted to generate an error signal at pin 1 of amplifier U4A. The signal then passes through low pass filter U4D and is again amplified and offset through amplifier U4C and variable resistor VR4 to obtain a DC position drive signal at connection lead P, communicated to the drive control circuit 134. The position drive signal will either be a DC positive or negative signal depending upon the error signal determined at pin 1 of differential amplifier U4A. For example, if the command signal is more positive than the position sense signal, the position drive signal at connection lead P will be positive, but if the command signal is less positive than the position sense signal, such as when an operator is turning down the stove's knob, then the position drive signal will be negative. Thus, it is the goal of the subject closed-loop control system to generate zero error, meaning that the signal indicative of the measured position is equal to the signal indicative of the command position. This is accomplished by the combination of amplifiers U4A and U4D to strive for an error free system by urging the measured position to become the command position by integrating the error signal through amplifier U4D and its associated shown network R30, R83 and C14.

With particular reference to the drive control signal (FIG. 5), if the position drive signal at connection lead P is positive, it will drive op amp U6A. If the drive signal is negative it will drive the op amp U6D. In other words, if the drive signal is positive with respect to ground, the magnitude of the positive signal will be output by diode D2, but if the drive signal is negative with respect to ground, then a positive magnitude of the drive signal with respect to ground (in other words, its absolute value) will be output at diode D3.

These respective drive signals then drive linear amplifiers U6B and U6C respectively to output the proportional drive signals on lead connections I and G, as were explained with respect to the power drive block 128. More specifically, if the drive signal P is positive, then the positive drive signal I to the drive circuit will be positive by the same amount as the signal P and the negative drive signal G will be zero (0). If the drive signal P is negative, the drive signal G will be positive by the amplitude that P is negative and the positive drive signal I will be zero (0).

Figure 5:
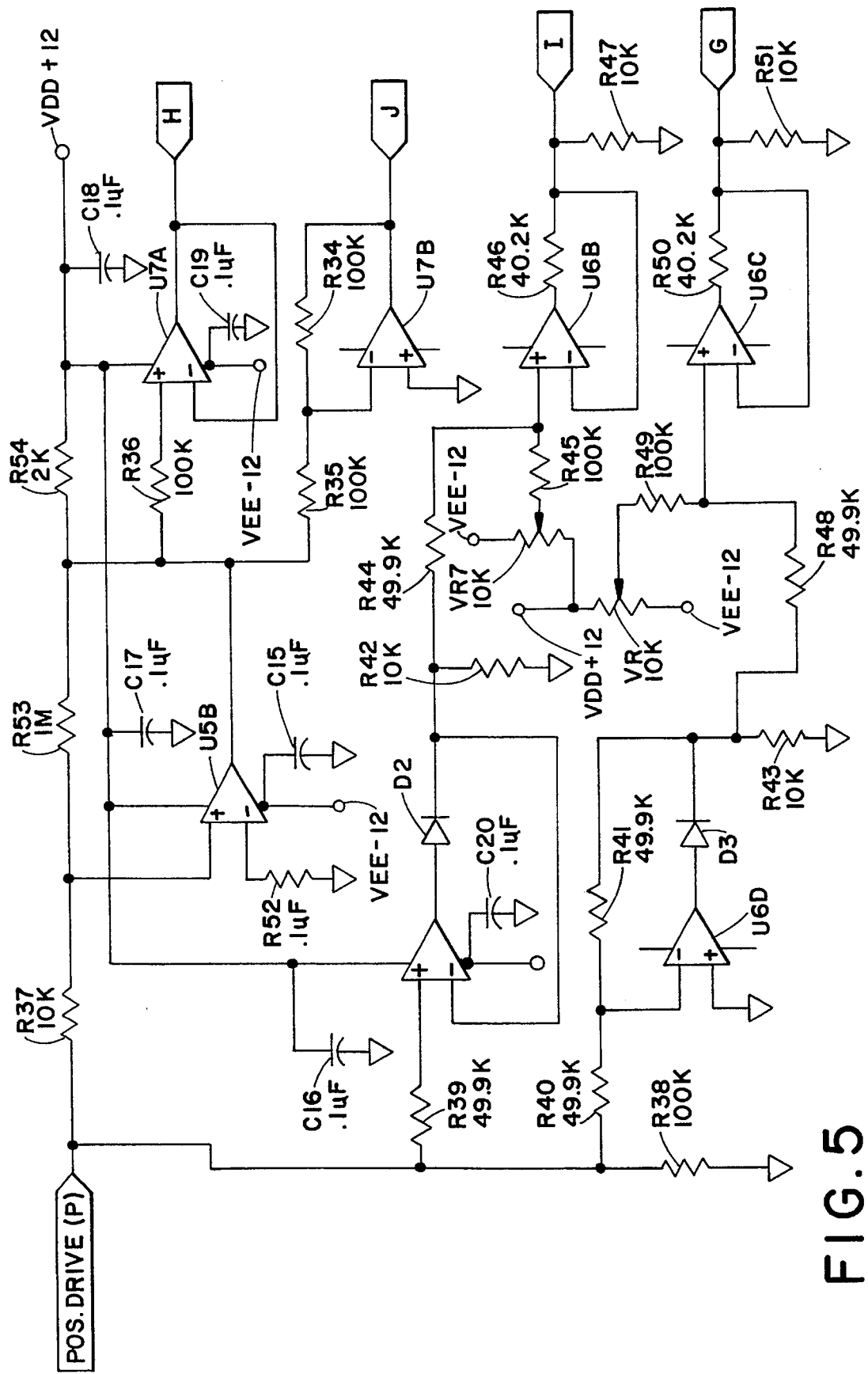
FIG. 5 comprises a detailed schematic of the drive circuit of FIG. 3.

With continued reference to FIGURE 5, the positive drive enable at lead connection H and the negative drive enable at lead connection J are enabled based upon a comparison at amplifier U5B. In other words, if the position drive signal is positive, then the logic output connection at pin 7 will be positive, but if the position drive signal P is negative, then the logic output at pin 7 will be negative. The output is set to be either a plus 12 volts for a positive output or a minus 12 volts for a negative output. A positive output from amplifier U5B will place a positive voltage at the positive drive enable connection H and a negative output from comparator U6B will put a positive output on the negative drive enable connection J. As can also be seen with respect to the circuit, when the positive drive enable is on, the positive drive lead connection I will be outputting the linear drive signal and when the negative drive enable connection is on then the negative drive G will put out the linear signal.

Figure 11:
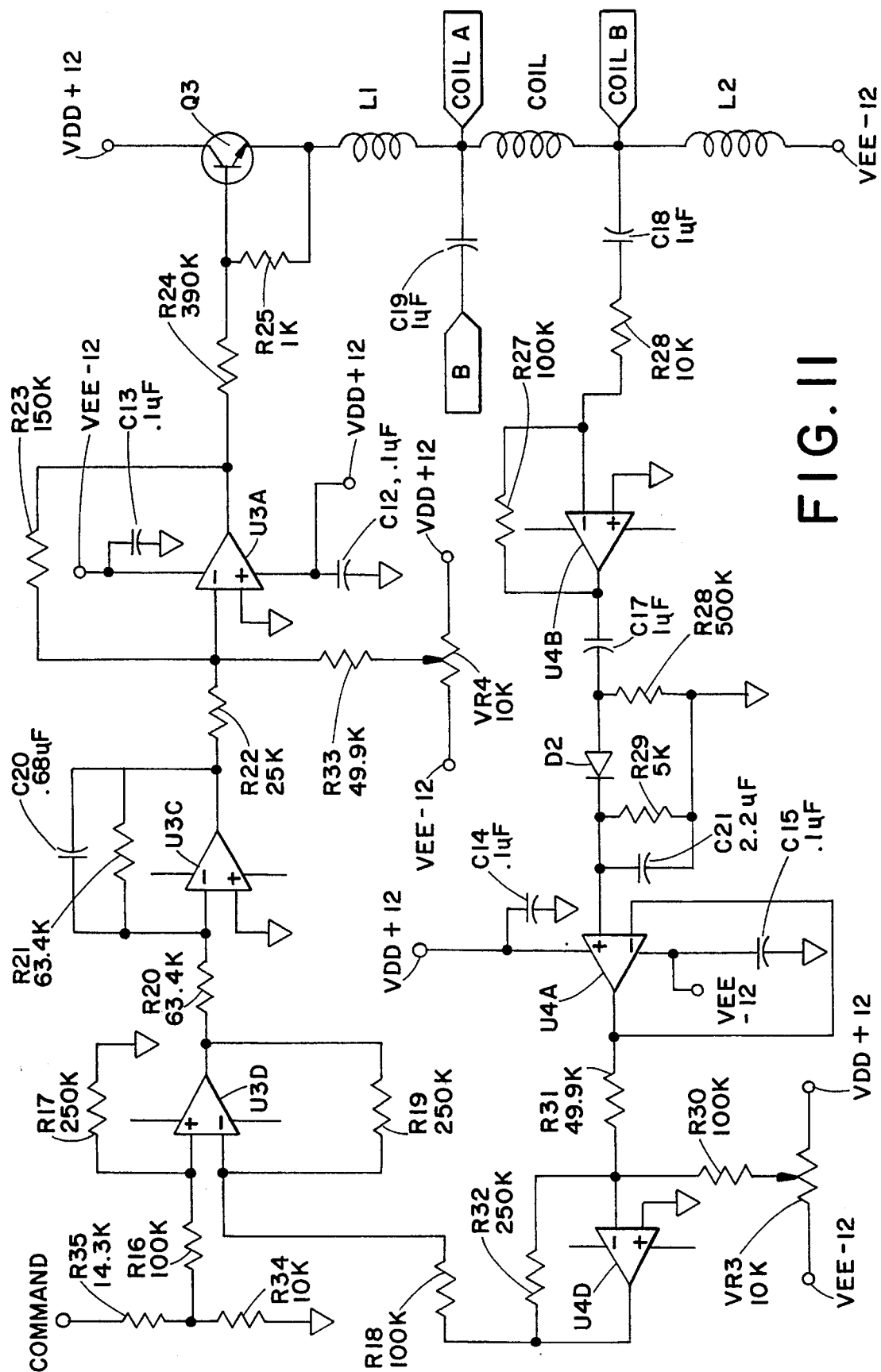
FIG. 11 is an alternative embodiment of a detailed schematic for the power drive and position sensor of blocks of FIG. 3.

With particular reference to FIG. 11, an alternative embodiment of the power drive circuit to that to FIG. 4 is shown therein. FIG. 4 illustrated a dual-ended driver circuit, which could effect a bidirectional operation on the actuator assembly of the valve. FIG. 11 comprises a single-ended driver circuit which relies upon a spring force to oppose a unidirectional drive signal. In this schematic, the position sense signal output by amplifier U4A of the position sensing circuit (FIG. 6) is impressed with the command signal on the differential amplifier U3D. The signal then passes through a low pass filter U3C and is offset with variable resistor VR4. The offset is necessary to properly set the drive signal to the driving transistor Q3 which controls the drive current to the coil 84. Blocking inductor L1 operates the same way as blocking inductors L1 or L3 of the dual ended driver circuit (FIG. 4). L2 gives the signal representative of measured valve member position and thereby operates in the same closed loop manner as the circuit of FIGS. 4–7.

Figure 8:
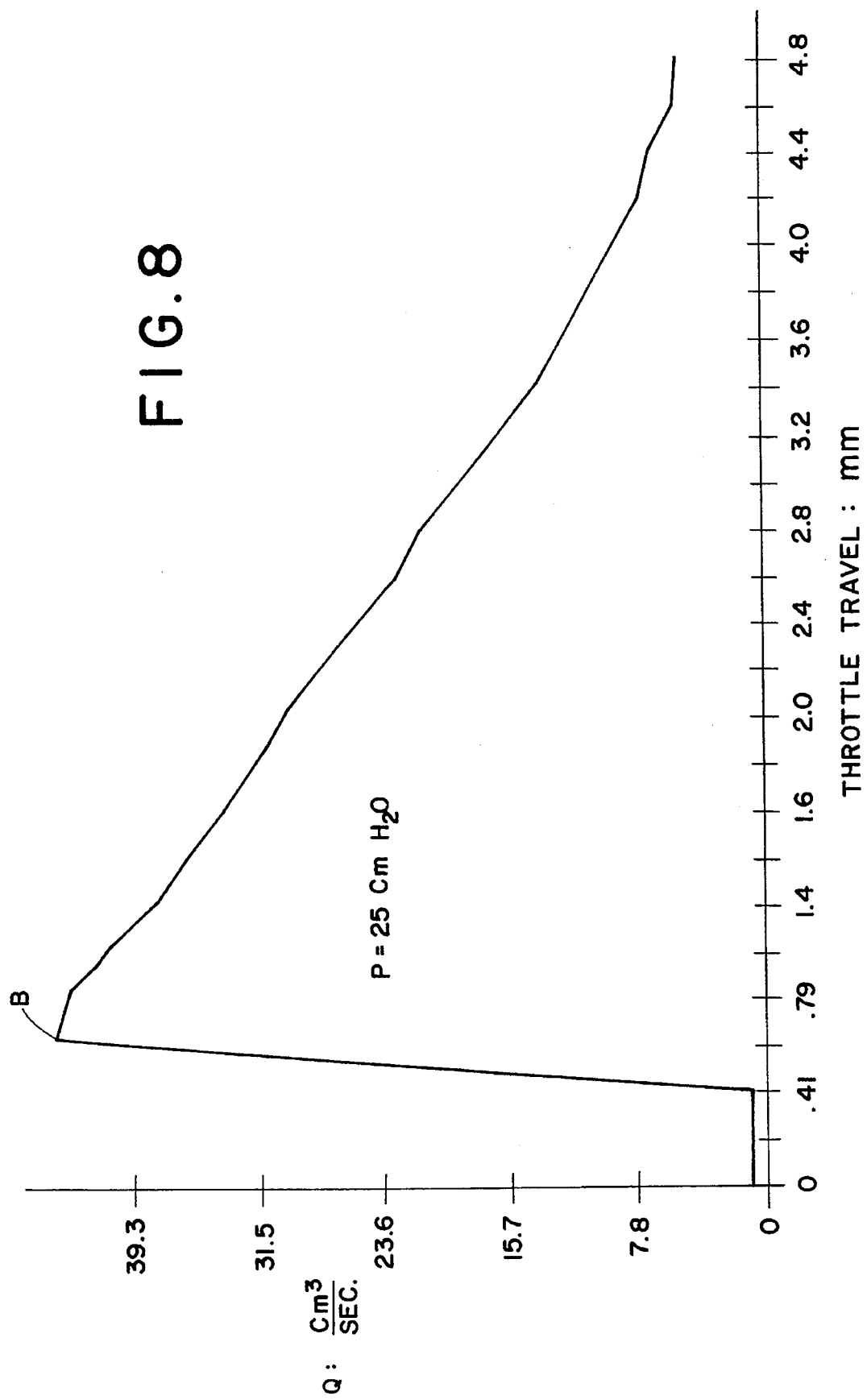
FIG. 8 is a plot of gas flow rate versus throttle travel of the valve metering member.
Figure 9:
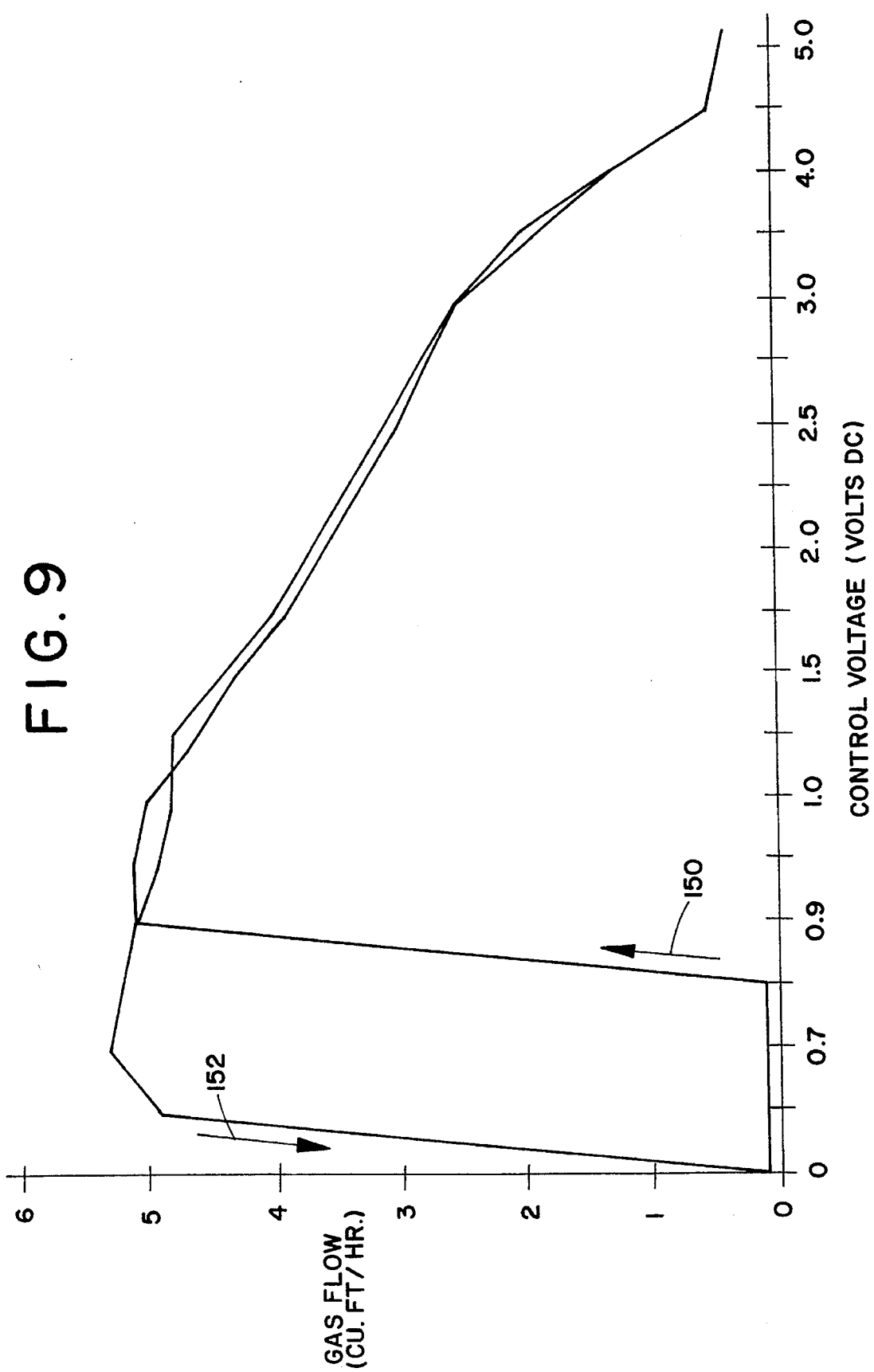
FIG. 9 is a plot of gas flow rate as a function of control voltage applied across the coil for the valve of FIG. 2.
Figure 10:
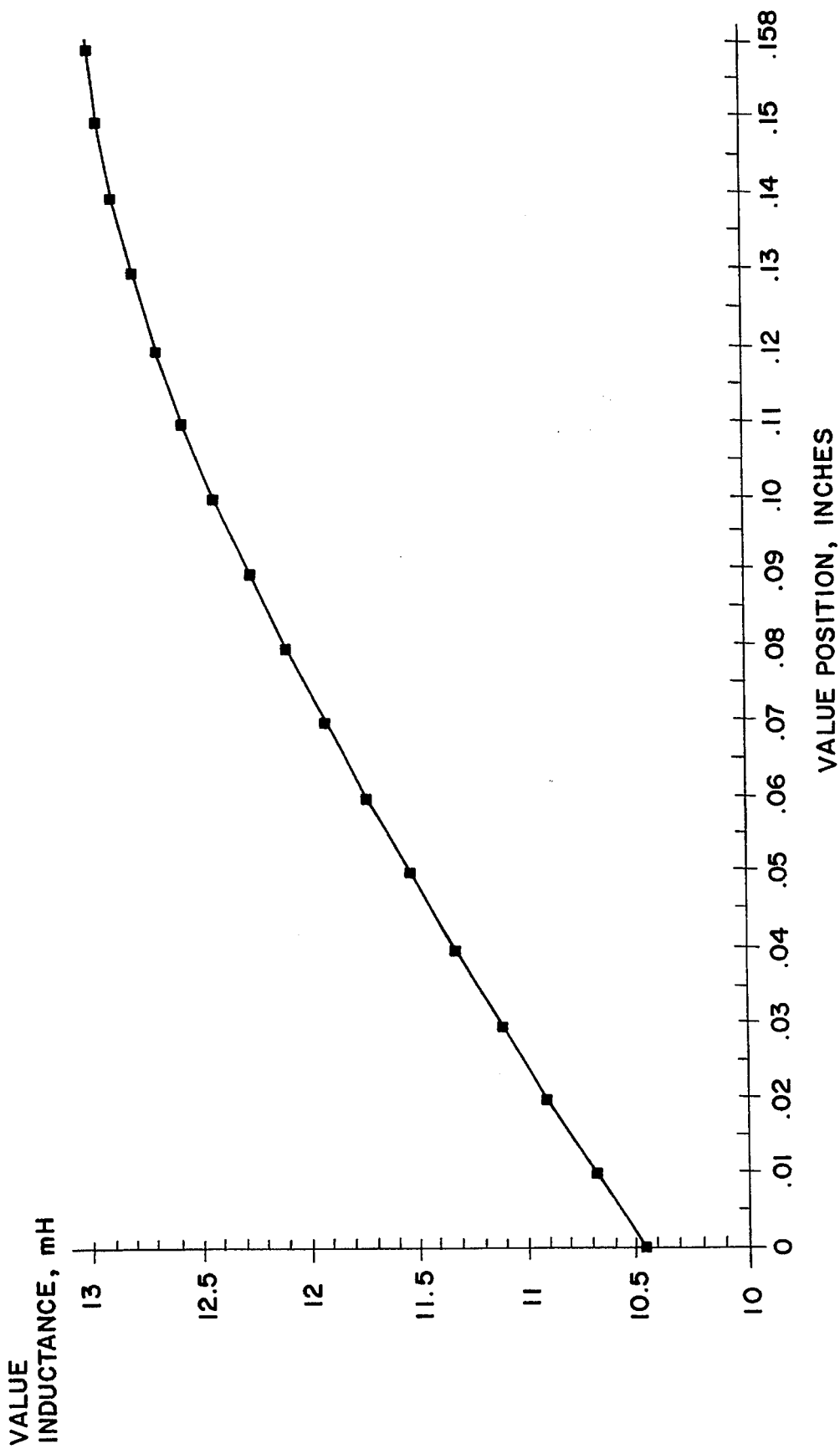
FIG. 10 is a plot of valve inductance versus position for the valve of FIG. 2.

With particular reference to FIGS. 8–10, plots are shown illustrating the performance characteristics of the gas valve under the control of the circuitry of the subject invention.

FIG. 8 illustrates the values of flow in cubic feet per second as a function of throttle travel for a valve in the configuration of FIG. 2 and having the dimensions mentioned above. It can be seen that below throttle travel of about 0.6 mm (point B on the curve), the gas flow is highly unstable and the valve will tend to oscillate if demanded to function within this range due to the gas flow going from essentially OFF to fully open within a very short travel distance. This feature of the valve must be accommodated so that the valve only operates in the essentially linear range beyond point B. This objective is accomplished with particular reference to FIG. 7 by a hold-off circuit comprising amplifier U8A and variable resistor VR5. When the command voltage is below the voltage on pin 2 as commanded by VR5, the output of amplifier U8A is turned ON to then turn ON transistor Q9 to prevent the command request voltage from going through to the circuit. In other words, the command voltage to the drive circuit is held at zero. In other words, at the input to resistor R20, the voltage would be zero. As the command voltage continues to increase, that is once the command voltage on pin 3 exceeds the voltage on pin 2 U8A, the comparator will then turn OFF and turn OFF transistor Q9 and the resistor R20 will take a step function from zero to the command voltage and then will follow out along to the rest of the circuit.

With particular reference to FIG. 9, this can be seen in the profile shown therein of gas flow versus control voltage for the portion of the curve shown by arrow 150. To prevent oscillating when the command voltage is at the trip point of the comparator, hysteresis must be included.

When turning the valve down by reducing the command or control voltage, and with continued reference to FIG. 7, the hysteresis function is built into the control circuitry by a combination of resistor elements R21 and R17 so that the voltage at which the comparator U8A turns OFF will be less than when it turns ON. This will be the hysteresis band necessary for stable control, and is illustrated in FIG. 9 by a portion of the curve designated by arrow 152. The spacing between arrows 152 and 150 comprises the hysteresis band of the control electronics. Thus, the valve can be turned OFF in a manner to avoid undesirable chatter in actual operation. Although the curves illustrated by arrows 150 and 152 appear to have a slight slope, in actual operation they function as a digital snap function to either quickly open or close the valve. Thus, it will be seen that a positive drive (position connection I, FIG. 4) shown by arrow 150 puts the valve at a fully open position with a control voltage of approximately 0.9 volts; and, flow decreases almost linearly with a control voltage to a maximum voltage of approximately 4.5 volts. On the negative drive (position connection G, FIG. 4) illustrated by arrow 152 it will be seen that the hysteresis loop characteristic of the valve takes effect and at voltage decrease provides an almost linear decrease in gas flow up to about one-half a volt and then rapidly decreases to near zero flow rate. FIG. 10 comprises a plot of valve position in inches versus valve inductance in millihenries. As can be seen with reference to FIG. 10, this plot is essentially a linear relationship and provides a basis for determining the valve position based upon measurement of a parameter representative of coil inductance.

The invention thus has the advantage of detecting coil inductance and, therefore, metering member position by merely using the two drive wires to the coil and without the addition of costly and complicated additional position sensing devices.

Having thus described the invention, we now claim:

1. A method of controlling an electromechanical actuator assembly including an actuating member associated with an electrical coil, wherein selective energization of the coil with a command signal indicative of a desired position for the actuating member effects a corresponding movement of the member towards a desired position, the method comprising steps of:

energizing the coil with a control signal through an electrical line to effect the corresponding movement of the actuating member from a first position to a second position, concurrently energizing the coil with a detection signal through the electrical line for generating detectable signals, sensing the detectable signals through the electrical line for associating a first detectable signal from said detection signal with said first position and for associating a second detectable signal from said detection signal with said second position, detecting a measurement representative of a difference between the second position and the desired position, and adjusting the control signal to minimize the difference measurement whereby a position of the actuating member is determined and controlled through the electrical line.

2. The method as defined in claim 1 a wherein the sensing step comprises forming a voltage divider about the electrical coil and detecting a parameter representative of the second detectable signal.

3. The method as defined in claim wherein the associating second detectable signal comprises a step of comparing the second detectable signal obtained from the sensing step with a predetermined command value.

4. The method as defined in claim 3 wherein the comparing step comprises relating the second position to the desired position of the actuating member.

5. The method as defined in claim 1 wherein the adjusting step comprises providing said control signal to the coil in a selective positive or negative direction.

6. A system for adjusting a drive signal to a coil in an electromagnetic actuator assembly comprising:

means for applying the drive signal and a detection signal to the coil through a drive wire;

means for detecting a parameter directly relating to and representing a position of an actuator in the actuator assembly, said position being associated with a particular inductance of the coil and said detecting occurring through said drive wire by which the drive signal is applied to the coil;

a source of command signals representing a predetermined desired position for the actuator;

circuit means coupled to said means for detecting and to said source to provide an output control signal when the detected position bears a predetermined relationship to the desired position; and drive signal adjustment means coupled to said circuit means and responsive to said drive signal therefrom for adjusting the drive signal to urge the actuator towards the predetermined desired position.

7. The system as defined in claim 6 wherein said means for detecting includes means for imposing said detection signal on said drive signal and for detecting said parameter from said detection signal including a voltage divider comprising said coil and a fixed value inductor connected to the coil.

8. The system as defined in claim 6 wherein the drive signal adjustment means includes drive circuit means for driving the actuator selectively in either a positive or negative direction.

* * * * *